(12) United States Patent
Birkelund

(10) Patent No.: US 6,459,348 B1
(45) Date of Patent: Oct. 1, 2002

(54) ELECTROMAGNETIC ACTUATOR

(75) Inventor: Michael Birkelund, Middelfart (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 10/009,669

(22) PCT Filed: May 23, 2000

(86) PCT No.: PCT/DK00/00275

§ 371 (c)(1),
(2), (4) Date: Nov. 13, 2001

(87) PCT Pub. No.: WO00/74085

PCT Pub. Date: Dec. 7, 2000

(30) Foreign Application Priority Data

May 29, 1999 (DE) .......................................... 199 24 767

(51) Int. Cl.$^7$ ................................................ H01F 7/08
(52) U.S. Cl. .................... 335/270; 335/251; 335/255; 335/260
(58) Field of Search ................................ 335/251, 255, 335/258, 260, 262, 273, 278; 251/129.15

(56) References Cited

U.S. PATENT DOCUMENTS

| | | | |
|---|---|---|---|
| 3,727,160 A | 4/1973 | Churchill | 335/251 |
| 3,917,218 A | 11/1975 | Marocco | 251/30 |
| 4,055,823 A | 10/1977 | Andersen | 335/255 |
| 4,683,453 A | 7/1987 | Vollmer et al. | 335/255 |
| 4,805,870 A | 2/1989 | Mertz | 251/129.15 |
| 5,581,222 A | 12/1996 | Pinaud | 335/278 |
| 5,739,599 A | * 4/1998 | Murai | 310/14 |

FOREIGN PATENT DOCUMENTS

| | | | |
|---|---|---|---|
| DE | 25 22 677 | 12/1976 | H01F/7/16 |
| EP | 0840333 A1 * | 6/1998 | H01F/7/16 |
| WO | 96/12906 | 5/1996 | F16K/31/06 |

* cited by examiner

Primary Examiner—Ramon M. Barrera
(74) Attorney, Agent, or Firm—McCormick, Paulding & Huber LLP

(57) ABSTRACT

An electromagnetic actuator, especially for the closure member of a valve, contains a solenoid unit, which has a cylindrical cavity closed at one end and open at the other end. An axially introduced guide tube for a magnetically movable armature is arrestable in the cavity by means of a securing device engageable in a first recess under spring force. To simplify connection of the actuator with and separation of the actuator from the component to be adjusted, provision is made for the securing device to lie completely within the solenoid unit and to snap automatically into the first recess when the guide tube is moved into a desired position in the cavity of the solenoid unit.

9 Claims, 3 Drawing Sheets

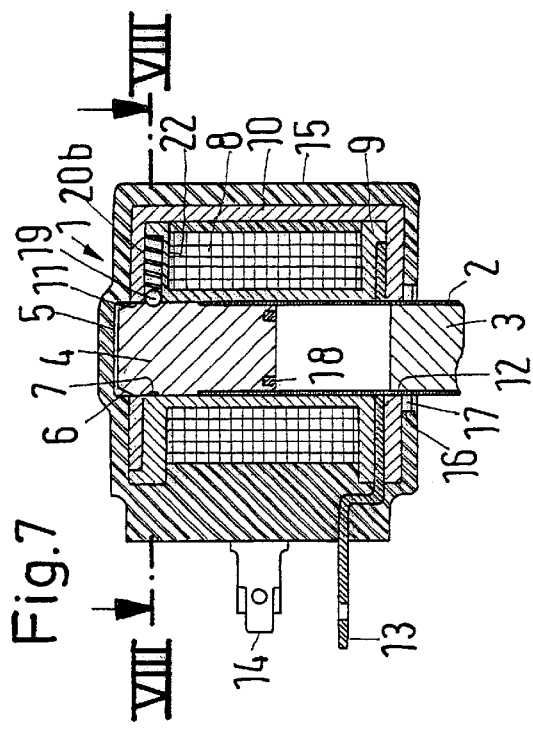
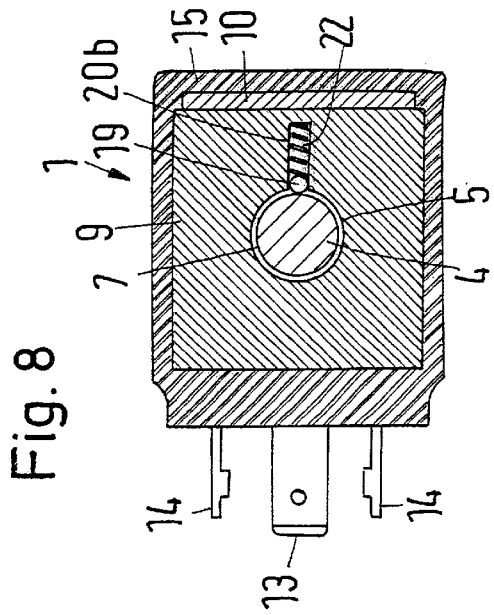

ELECTROMAGNETIC ACTUATOR

CROSS-REFERENCE TO RELATED APPLICATIONS

This Application is entitled to the benefit of and incorporates by reference essential subject matter disclosed in German Patent Application No. 199 24 767.6 filed on May 29, 1999; and International Application No. PCT/DK00/00275 filed on May 23, 2000 in the name of Danfoss A/S.

FIELD OF THE INVENTION

The invention relates to an electromagnetic actuator, especially for the closure member of a valve, having a solenoid unit, which has a cylindrical cavity closed at one end and open at the other end in which an axially introduced guide tube for a magnetically movable armature is arrestable by means of a securing device engageable in a first recess under spring force.

BACKGROUND OF THE INVENTION

An actuator of that kind is known from U.S. Pat. No. 4,683,453. With this actuator, the securing device is a forked sheet-metal spring having two limbs that have hooks at their free ends. After the guide tube has been introduced into the cavity, the securing device has to be introduced from the outside, through a slot extending radially through the wall of the solenoid unit, into an annular groove, forming the first recess, on the circumference of a collar of the guide tube; for removal of the guide tube from the cavity, the securing device has to be pulled partially out of the slot. Both in its inserted position and in its pulled-out position the securing device protrudes inconveniently beyond the circumference of the solenoid unit because of an angled handle, so that a user may sustain injury when handling the actuator. Furthermore, introduction and pulling out of the guide tube requires manipulation of the securing device each time.

In the case of similar actuators (U.S. Pat. No. 4,055,823=DT 25 22 677 B2, U.S. Pat. Nos. 5,581,222, 4,805,870, 3,917,218, 3,727,160, WO 96/12906) the securing device also lies partially or wholly outside the solenoid unit, and in the case of some of these actuators can be removed completely, either intentionally or unintentionally. Furthermore, in some of these known actuators, the guide tube projects with both ends from the solenoid unit, so that the cavity can more easily become contaminated.

The invention is based on the problem of providing an actuator of the kind mentioned in the introduction, in which the connection between the solenoid unit and the guide tube is simpler and safer both to produce and, in case of need, to release, but which actuator is nevertheless simpler to manufacture.

SUMMARY OF THE INVENTION

That problem is solved in accordance with the invention in that the securing device lies completely within the solenoid unit and automatically snaps into the first recess when the guide tube is moved into a desired position in the cavity of the solenoid unit.

In particular, the securing device can be mounted in a second recess formed in the inner side of the wall of the cavity and can be arranged to be pressed laterally out of the cavity by a relative movement of the guide tube and the solenoid unit.

In this construction, connection and separation of the solenoid unit and the guide tube is possible merely by respectively fitting together and pulling apart these two parts, without the securing device having to be manipulated additionally. Further, fitting together can be rendered automatic in a simple manner. Since the securing device lies in each position inside the magnetizing coil, the risk of injury to the user of the actuator by the securing device is avoided. The securing device can be of a very simple form without a handle and hooks, so that it can be manufactured easily using little material.

Preferably, provision is made for the first recess to be formed in a magnet core, and for the magnet core to be connected to an end portion of the guide tube introduced into the cavity. The magnet core increases the strength of the magnetic flux within the cavity and hence the relative force of attraction of solenoid unit and armature, that is the operating force of the actuator, for the same number of ampere-turns of the magnetizing coil. The first recess can be formed in a simple manner with largely oblique lateral surfaces, which, firstly, facilitate introduction of the guide tube through the axial force component exerted over one oblique lateral surface as the securing device snaps in and, secondly, facilitate lateral pushing away of the securing device out of the cavity into the second recess over the other oblique lateral surface. In this case, the securing device at the same time additionally takes on the function of securing the installed position of the magnet core. Additional means for securing the position of the magnet core are consequently unnecessary. The magnetic core is mounted at the same time as the guide tube.

A development of the invention can consist in that the second recess is formed in the inner side of a coil former, which inner side bounds the cavity, and at the same time in an end face of the coil former, the coil former being surrounded by the magnetizing coil, and is covered by a magnet yoke lying adjacent to this end face. This development enables the second recess to be formed in a simple manner, since the end face of the coil former is initially readily accessible. After that, the recess can be bounded and hence completed by the abutting lateral surface of the magnet yoke covering it, the magnet yoke also increasing the strength of the magnetic flux and hence the relative force of attraction of solenoid unit and armature for the same number of ampere-turns of the magnetizing coil.

The magnet core can be introduced into an opening in the magnet yoke. This avoids a relatively large air gap between magnet core and magnet yoke.

The first recess is preferably an annular groove. The annular groove facilitates connection of the solenoid unit and guide tube, since no attention need be paid to maintaining a predetermined rotated angular position of the guide tube relative to the securing device as the guide tube is introduced into the cavity.

The securing device is preferably a spring wire, which is engageable with a portion of its length in the first recess. Such a spring wire is a very simple component that is easy to manufacture. For mounting, the spring wire merely needs to be inserted with its ends into the ends of the recess. Its middle portion is then flexible for the largest part of the length of the second recess.

In particular, this can be achieved in that the second recess extends along a plane intersecting the guide tube parallel to its longitudinal axis, and extends transversely to the longitudinal direction of the guide tube, is, over the largest part of its length perpendicular to the plane, deeper than the spring wire is thick, and at its ends perpendicular to the plane has a depth corresponding to the diameter of the spring wire.

Alternatively, the securing device can be a spring-loaded ball or a clip having two flexible arms.

The magnetizing coil, the coil former, and the magnet yoke are preferably embedded in plastics material. This fixes these components relative to one another. At the same time, the cavity is sealed at its one end.

BRIEF DESCRIPTION OF THE DRAWINGS

The invention and its developments are described in detail hereinafter with reference to the accompanying drawings of preferred exemplary embodiments. In the drawings:

FIG. 5 shows an axial section through a second exemplary embodiment of an electromagnetic actuator according to the invention for a valve, FIG. 6 shows the section VI—VI of FIG. 5, FIG. 7 shows an axial section through a third exemplary embodiment of an electromagnetic actuator according to the invention for a valve, and FIG. 8 is the section VIII—VIII of FIG. 7.

DETAILED DESCRIPTION OF THE PREFERRED EMBODIMENTS

Figure 1:
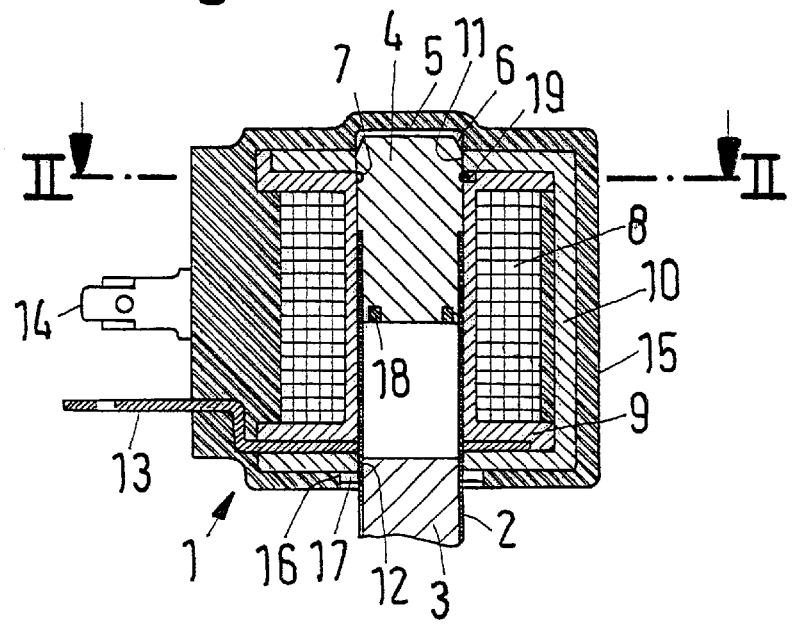
FIG. 1 shows an axial section through an exemplary embodiment of an electromagnetic actuator according to the invention for a valve.

The electromagnetic actuator according to FIGS. 1 to 4 contains a solenoid unit 1 and a cylindrical guide tube 2 of magnetically impermeable material, for example, austenitic steel. An armature 3 connected to the closure member of a valve, not shown, is guided in the guide tube so as to be axially displaceable. The end of the guide tube 2 inserted in a cylindrical cavity 5 of the solenoid unit 1 is closed by a magnet core 4, which is fastened in the guide tube 2, for example, by laser welding, and projects from the guide tube 2. The end of the magnet core 4 projecting from the guide tube 2 has a conically tapering face 6. Further, in the end portion of the magnet core 4 projecting from the guide tube 2 there is formed an annular groove 7 of approximately semicircular cross-section encircling the magnet core 4.

The solenoid unit 1 contains a magnetizing coil 8 on a coil former 9 having a cylindrical through-opening, which bounds the cavity 5 laterally and receives the guide tube 2 with magnet core 4 so that it fits yet is axially displaceable. The magnetizing coil 8 and the coil former 9 are arranged in a magnet yoke 10 of magnetically permeable material of largely U-shaped cross-section. Each of the two limbs of the magnet yoke 10 is provided with a respective through-opening 11, 12. The guide tube 2 and the magnet core 4 are led through the openings 11,12. An electrical connecting lug 13 is connected to the magnet yoke 10. Corresponding connecting lugs 14 are connected to the ends of the magnetizing coil 8. The magnetizing coil 8, the coil former 9 and the magnet yoke 10 are embedded in a capsule 15 of plastics material which has been injected around them. The capsule 15 seals off the cavity 5 at one end opposite the magnet core 4, but at the other end of the cavity 5 leaves free an opening 16 of a somewhat larger diameter than that of the guide tube 2, so that there remains free right around the guide tube 2 an annular space 17, in which an elastomeric gasket of plastics material, not shown, is arranged. The cavity 5 is consequently sealed at both ends. The risk of contamination of the cavity 5 between the guide tube 2 and the magnetic core 4 on the one hand, and the openings 11, 12 and the inner side of the coil former 9 bounding the cavity 5 on the other hand, is therefore largely avoided.

When an operating voltage is applied to the magnetizing coil 8 and as a result of the magnetic field generated in the guide tube 2 by the electric current then flowing through the magnetizing coil 8, the armature 3 is attracted by the magnet core 4 against the force of a spring, not shown, which restores the magnet core 4 to its starting position again when the operating voltage is switched off. The valve closure member connected to the armature 3 is displaced in each case into a position in which the valve is open or closed.

In the end of the magnet core 4 facing the armature 3 a short-circuiting ring 18 is secured in an annular groove; when using an alternating voltage as the operating voltage of the magnetizing coil 8 there is induced in the short-circuiting ring a short-circuit current that is phase-shifted with respect to the alternating current in the magnetizing coil. The magnetic field of the short-circuit current prevents the armature 3 from dropping off the magnet core 4 at the passage through zero of the magnetizing coil current and hence of the magnetic field generated by this.

Figure 2:
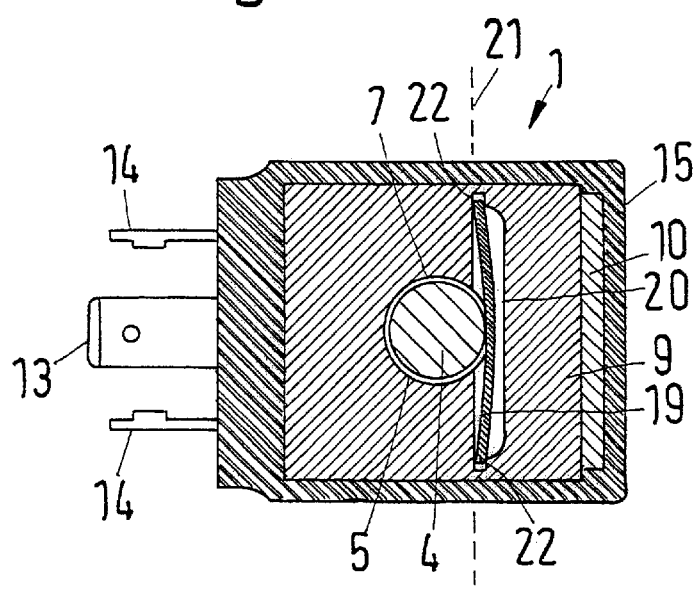
FIG. 2 shows the section II—II of FIG. 1.
Figure 3:
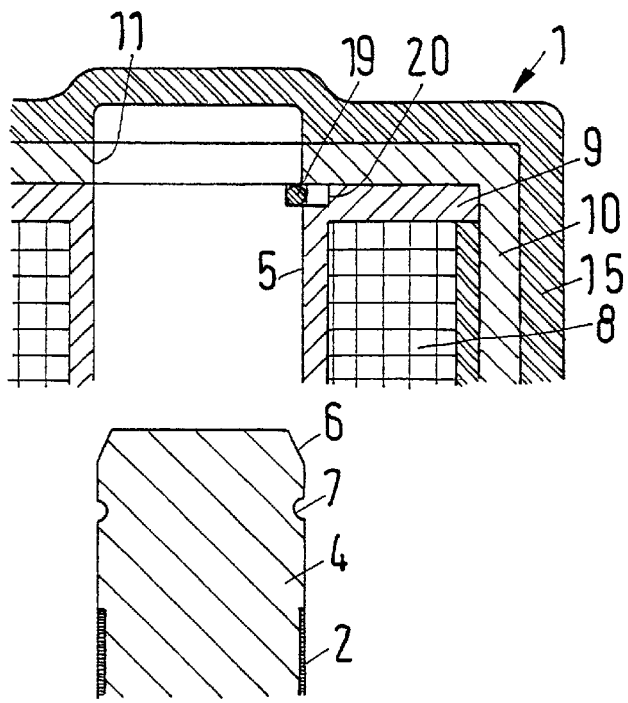
FIG. 3 shows an enlarged portion of FIG. 1 before the introduction of the guide tube into the cavity.
Figure 4:
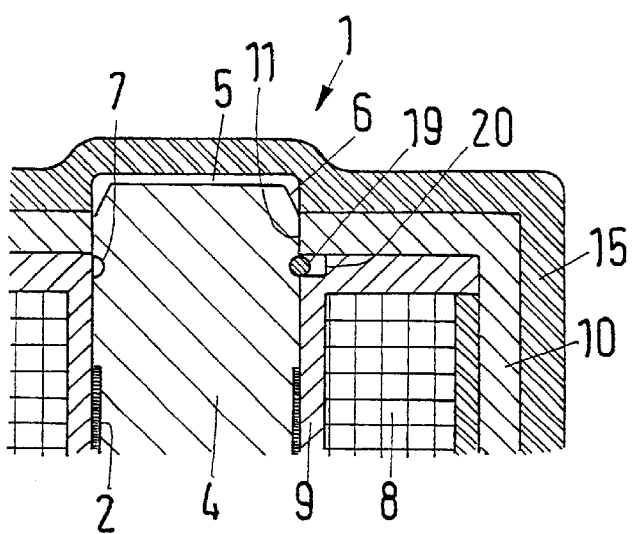
FIG. 4 shows the same portion as FIG. 3, but after the introduction of the guide tube into the cavity.

The cross-section II—II shown in FIG. 2 and the axial sections shown in FIGS. 3 and 4 reveal more clearly how the solenoid unit 1 and the guide tube 2 are connected to each other by means of a securing device 19 in the form of a spring wire and by means of the magnet core 4, when the guide tube 2 with the magnetic core 4 in front is introduced from the position illustrated in FIG. 3 into the position in the cavity 5 illustrated in FIGS. 1, 2 and 4. To effect this connection by means of a securing device in the form of a simple spring wire, one end surface of the coil former 9 contains an elongate recess 20 which, as shown in FIG. 2, extends along a plane, indicated by a broken line, intersecting the guide tube and the cavity parallel to its longitudinal axis, and extends transversely to the longitudinal direction of the guide tube 2 and the cavity 5. For the greatest part of its length perpendicular to the plane 21, the recess 20 is deeper than the securing device 19 is thick. At its ends 22, perpendicular to the plane 21 the recess 20 has a depth corresponding to the diameter of the spring wire. These ends 22 therefore lie laterally adjacent to the plane 21 and, in the inserted position of the guide tube 2 and the magnet core 4 in the cavity 5, the middle portion of the securing device 19 overlies the edge formed jointly by the recess 20 and the inner side of the coil former 9 bounding the cavity 5 (FIGS. 1, 2 and 4). In this connection, although the securing device is resiliently bent with its middle portion further into the recess 20, the securing device 19 nevertheless engages both in the annular groove 7 of the magnet core 4 and in the recess 20, so that it fixes the position of the guide tube 2 and the magnet core 4 in the cavity 5. Before introducing the guide tube 2 with the magnet core 4 into the cavity 5, in the position shown in FIG. 3 the securing device 19 lies in a straight line somewhat deeper in the cavity 5 (FIG. 3). As the magnetic core 4 with the guide tube 2 is inserted into the cavity 5, the middle portion of the securing device 19 is first of all pressed completely out of the cavity 5 by the oblique surface 6 of the magnet core 4, and then snaps into the annular groove 7 of the magnet core 4 (into the position shown in FIGS. 1, 2 and 4). If desired, the guide tube 2 together with the magnet core 4 can be pulled out of the cavity 5 again in order to separate the actuator from the valve. Here, one substantially oblique side of the annular groove 7, in FIG. 4 the upper oblique side, presses the middle portion of the securing device 19 somewhat further into the recess 20, so that the securing device 19 snaps out of the annular groove 7 and the guide tube 2 with the magnet core 4 can easily be pulled out of the solenoid unit 1.

Both when inserting the guide tube 2 and magnet core 4 into the cavity 5 in order to connect the actuator with the valve and when pulling the guide tube 2 and the magnet core 4 out of the cavity 5 in order to separate the actuator from the valve, all that is required is an axial relative movement of guide tube 2 and solenoid unit 1, which in a simple manner can be effected automatically or manually without further movements or manipulations being necessary.

The recess 20 and also the spring wire forming the securing device 19 are easy to make, the opening of the recess 20 flush with the end face of the coil former 9 being covered by the magnet yoke 10. Because the magnet core 4 projects in the inserted position into the opening 1 of one limb of the magnet yoke 10, it is not only additionally guided at its side by this opening 11 but also provides sufficient material for a solid and a fixed limitation of the annular groove 7 towards the (upper) free end of the magnet core 4, in comparison with a case in which the opening 11 is omitted and the free end of the magnet core 4 lies against the limb of the magnetic yoke 10. Moreover, the spring force of the securing device 19 presses the magnet core 4 against the edge of the opening 11, so that on the one hand there is a good electrical contact between the magnet yoke 10, which for safety reasons is connected to earth or ground potential via the terminal 13, and the valve body via the magnet core 4 and the guide tube 2 and, on the other hand, a good magnetic contact between the magnet yoke 10 and the magnet core 4, which reduces the magnetic resistance at the contact point and hence increases the magnetic flux in the core and consequently the force of attraction between the magnet core 4 and the armature 3 for the same number of ampere-turns of the magnetizing coil 8.

The locking or snap-action connection effected by the annular groove 7 and the securing device 19 in combination with their cross-sectional roundings that are largely matched to one another, additionally leads to automatic positioning of the guide tube 2 and magnet core 4 in a defined position in the cavity 5, compensating for any excess of axial clearance between the free end of the magnet core 4 and the inside of the capsule 15, in the sense that the clearance can be chosen to be greater than absolutely necessary, whilst nevertheless secure engagement of the securing device 19 in the annular groove 7 is ensured before the annular groove 7 is moved too far beyond the position of the recess 20 as the magnet core 4 is inserted into the cavity 5. If the clearance were to be located at the lower limit, if there were to be an accidental undersize as a result of manufacturing tolerances, reliable (complete) snapping in, and hence a reliable connection, would not be ensured. With an excess of clearance, which does not exceed the radius of the spring wire and the annular groove 7, the spring wire could still snap into the annular groove 7 even if the magnet core 4 were to be introduced first as far as contact with the capsule 15, since the spring wire engaging initially eccentrically in the annular groove 7 would pull the magnet core 4 back into the correct position again. Locking in or snapping in is also perceptible and audible, which can be taken as an indication of correct coupling, if desired by automatic measuring.

The force required for connection and separation of solenoid unit 1 and guide tube can be so determined, through appropriate choice of the diameter of the spring wire and the depth of the recess 7, that actuators with solenoid units having different interference fits can be constructed.

The exemplary embodiment according to FIGS. 5 and 6 differs from the preceding embodiment substantially only in that the securing device 19 is not in the form of a spring wire but an approximately U-shaped clip, and the recess 20a largely corresponds to this U-shape. The clip forming the securing device 19 has resilient arms which are pressed radially out of the cavity 5 by the oblique surface 6 on insertion of the guide tube 2 with the core 4, and then snap into the annular groove 7. Additionally, in their edge facing towards the magnet core 4 the spring arms have a cut-out in the shape of part of a circle, the diameter of which corresponds to the internal diameter of the annular groove 7. In the engaged position of the magnet core 4 shown in FIGS. 5 and 6, the spring arms of the securing device 19 therefore also span the gap between the inside of the cavity 5 and the outside of the magnet core 4. Furthermore, by spreading the spring arms of the securing device 19 apart, the magnet core 4 can also be removed from the cavity 5 again comparatively easily by virtue of the slightly oblique lateral wall of the annular groove 7 (the upper lateral wall in FIG. 5), in order to separate the actuator from the valve.

The exemplary embodiment shown in FIGS. 7 and 8 differs from that shown in FIGS. 1 to 4 likewise substantially only in the form of the securing device 19, which in this case comprises a ball that is loaded towards the annular groove 7 by a spring 22, here a helical spring, arranged in the recess 20b in the form of a radial groove, and snaps into the annular groove 7 when the guide tube 2 with the core 4 is inserted into the cavity 5. Conversely, the guide tube 2 and the magnet core 4 can easily be pulled out of the cavity 5 again as desired to separate the actuator from the valve.

What is claimed is:

1. An electromagnetic actuator, especially for the closure member of a valve, having a solenoid unit, which has a cylindrical cavity closed at one end and open at the other end, in which an axially introduced guide tube for a magnetically movable armature is arrestable by means of a securing device engageable in a first recess under spring force, the securing device lying completely within the solenoid unit and automatically snapping into the first recess when the guide tube is moved into a desired position in the cavity of the solenoid unit.

2. An actuator according to claim 1, wherein the securing device is mounted in a second recess formed in an inner side of the wall of the cavity and is arranged to be pressed laterally out of the cavity by a relative movement of guide tube and solenoid unit.

3. An actuator according to claim 2, wherein the second recess is formed in an inner side, bounding the cavity, of a coil former, and at the same time in an end face thereof, the coil former being surrounded by a magnetizing coil, and is covered by a magnet yoke lying adjacent to this end face.

4. An actuator according to claim 1, wherein the first recess is formed in a magnet core, and the magnet core is connected to an end portion of the guide tube introduced into the cavity.

5. An actuator according to claim 4, wherein the magnet core is insertable into an opening of a magnet yoke.

6. An actuator according to claim 1, wherein the first recess is an annular groove.

7. An actuator according to claim 1, wherein the securing device is a spring wire which is engageable with a portion of its length in the first recess.

8. An actuator according to claim 7, wherein a second recess, the spring wire mounted therein, extends along a plane that intersects the guide tube approximately parallel to its longitudinal axis, and extends transversely to the longitudinal direction of the guide tube, and is over the largest part of its length approximately perpendicular to the plane, deeper than the spring wire is thick, and at its ends approximately perpendicular to the plane has a depth corresponding to the diameter of the spring wire.

9. An actuator according to claim 1, wherein the securing device is a spring-loaded ball or a clip having two flexible arms.

* * * * *